United States Patent [19]

Paterson et al.

[11] Patent Number: 4,939,513

[45] Date of Patent: Jul. 3, 1990

[54] SYSTEM FOR ALERTING A PILOT OF A DANGEROUS FLIGHT PROFILE DURING LOW LEVEL MANEUVERING

[75] Inventors: Noel S. Paterson, Bothell; Everette E. Vermilion, Seattle, both of Wash.

[73] Assignee: Sundstrand Data Control, Inc., Redmond, Wash.

[21] Appl. No.: 642,544

[22] Filed: Aug. 20, 1984

Related U.S. Application Data

[63] Continuation-in-part of Ser. No. 494,590, May 13, 1983, abandoned.

[51] Int. Cl.$^5$ .............................................. G08B 21/00
[52] U.S. Cl. ...................................... 340/970; 340/963; 342/65; 364/433
[58] Field of Search .............................. 340/959–960, 340/963–964, 973, 975, 977, 978, 945, 967–970; 73/178 R, 178 T; 364/427–430, 431.01, 433, 434; 244/180, 181; 343/7 TA; 342/65

[56] References Cited

U.S. PATENT DOCUMENTS

| | | | |
|---|---|---|---|
| 3,578,269 | 6/1969 | Kramer | 364/428 |
| 3,691,356 | 9/1972 | Miller | 73/178 T |
| 3,697,731 | 10/1972 | Kempema et al. | 364/431.01 |
| 3,848,833 | 11/1974 | Rauschelbach | 364/434 |
| 3,922,637 | 11/1975 | Bateman | 340/970 |
| 3,946,358 | 3/1976 | Bateman | 340/970 |
| 3,947,808 | 3/1976 | Bateman | 73/178 R |
| 3,947,809 | 3/1976 | Bateman | 340/964 |
| 3,947,810 | 3/1976 | Bateman et al. | |
| 4,030,065 | 6/1977 | Bateman | 340/970 |
| 4,121,194 | 10/1978 | Downey et al. | 340/959 |
| 4,215,334 | 7/1980 | Bateman | 340/970 |
| 4,319,218 | 3/1982 | Bateman | 340/959 |
| 4,383,299 | 5/1983 | Fischer et al. | 364/434 |
| 4,390,950 | 6/1983 | Muller | 340/968 |

Primary Examiner—Joseph A. Orsino
Assistant Examiner—Brent A. Swarthout
Attorney, Agent, or Firm—Mason, Kolehmainen, Rathburn & Wyss

[57] ABSTRACT

A system that warns the pilot of an aircraft performing low level maneuvers of a dangerous flight profile monitors the altitude of the aircraft above ground, and provides a first specific warning to the pilot if the altitude of the aircraft drops below a predetermined minimum altitude above ground. The system further monitors the roll angle and descent rate of the aircraft to provide a second specific warning if the descent rate of the aircraft exceeds a predetermined rate determined by the roll angle of the aircraft if the aircraft is below a second predetermined altitude above ground.

55 Claims, 3 Drawing Sheets

SYSTEM FOR ALERTING A PILOT OF A DANGEROUS FLIGHT PROFILE DURING LOW LEVEL MANEUVERING

CROSS-REFERENCE TO RELATED APPLICATION

This application is a continuation-in-part of copending patent application Ser. No. 494,590, filed on May 13, 1983, now abandoned.

BACKGROUND OF THE INVENTION

1. Field of the Invention

This invention relates generally to ground proximity warning systems, and more particularly to a system that protects an aircraft during low altitude maneuvers if the aircraft should descend below a predetermined minimum altitude above ground, or if the aircraft exceeds a predetermined descent rate while performing turning maneuvers or other maneuvers requiring a roll. Distinct specific warnings are given in order to inform the pilot of the specific action that must be taken to recover from a dangerous flight profile.

2. Description of the Prior Art

Ground proximity warning systems that warn a pilot of a dangerous flight profile are known. These systems provide warnings to the pilot of an aircraft under various unsafe flying conditions including flying below a preset minimum altitude, and permitting the aircraft to attain an excessive descent rate after take-off or on approach. An example of a system that provides a pilot with a warning if he drops below a predetermined minimum desired altitude is a system that compares the radio altitude with the minimum decision altitude setting, or "bug" setting on the radio altimeter, and provides an aural or visual warning if the radio altitude drops below the set minimum decision altitude. Examples of systems that provide a warning to a pilot during a take-off or a missed approach phase of operation if the aircraft should descend at an excessive barometric rate or lose a predetermined amount of barometric altitude are disclosed in U.S. Pat. Nos. 3,946,358; 3,947,808; 3,947,810 and 4,319,218, assigned to the same assignee as the present invention.

While these systems serve to provide the pilot with a warning in the event that the aircraft drops below a preset minimum desired altitude above ground, or if the aircraft descends excessively after take-off or a missed approach, such systems are designed primarily for transport aircraft that do not normally fly at low altitudes or execute turns or other severe or violent maneuvers near the ground. Consequently, such systems would not normally provide adequate warning to the pilot of a highly maneuverable aircraft such as, for example, a fighter/attack aircraft executing tactical maneuvers near the ground.

SUMMARY OF THE INVENTION

Accordingly, it is an object of the present invention to provide a warning system that overcomes many of the disadvantages of the prior art warning systems during high speed, low level maneuvering phases of aircraft operation.

It is another object of the present invention to provide a warning system designed to provide the pilot of a high performance aircraft such as a fighter/attack aircraft cruising at low altitude with a warning indicating a dangerous flight condition in sufficient time to permit him to take corrective action.

It is another object of the present invention to provide the pilot of an aircraft executing turning and banking maneuvers near the ground with a warning of a dangerous condition such as an excessive descent rate in sufficient time to permit the pilot to take corrective action for two different aircraft.

It is yet another object of the present invention to provide a warning of an excessive radio altitude loss during take-off into rising terrain.

The mission flight profile of a fighter/attack aircraft contains low altitude cruise and attack segments, and if the pilot becomes distracted or disoriented, there is a danger of inadvertent descent into terrain or flight into slowly rising terrain. The danger of flying into rising terrain exists primarily during take-off, and during low altitude cruise. The danger of inadvertent descent is greatest during low level maneuvers requiring high roll angles, such as are encountered during an attack portion of a flight, because the pilot can easily become distracted and disoriented during such maneuvers, and because aircraft tend to sink when they are subjected to high roll angles.

Therefore, in accordance with a preferred embodiment of the invention, there is provided a warning system that senses the altitude of the aircraft above the ground utilizing a radio altimeter or the like, and provides a specific aural warning, such as "TOO LOW" to the pilot if the aircraft descends below a predetermined minimum desired altitude above ground, thereby providing protection during low altitude cruise phases of operation. The predetermined minimum desired altitude is typically the minimum decision altitude which is manually set by the minimum decision altitude marker or altimeter "bug" present on a radio altimeter.

Also, in order to provide a warning during take-off into rising terrain, or during an inadvertent descent before the minimum decision altitude is reached, the system is provided with an accumulator that monitors the radio altitude after take-off and stores the highest altitude reached after take-off. In the event that the aircraft descends below a predetermined percentage of the maximum radio altitude reached prior to reaching the minimum decision altitude, a warning is also generated. Typically, this warning will be the same "TOO LOW" warning that is generated if the minimum decision altitude is penetrated in order to indicate to the pilot that he is too low.

In addition, the system monitors the roll angle of the aircraft and generates a second specific warning in the event that the aircraft is below a second predetermined altitude, and exceeds a predetermined descent rate which varies as a function of the roll angle of the aircraft in order to warn the pilot that the aircraft is descending at an excessively high rate during a roll maneuver. The warning given should be specific enough to enable the pilot to diagnose the problem quickly, and in the present embodiment, a warning such as the warning "ROLL OUT" or similar term is provided.

DESCRIPTION OF THE DRAWING

These and other objects and advantages of the present invention will become apparent upon consideration of the following detailed description and attached drawing, wherein.

DETAILED DESCRIPTION OF THE PREFERRED EMBODIMENT

Figure 1:
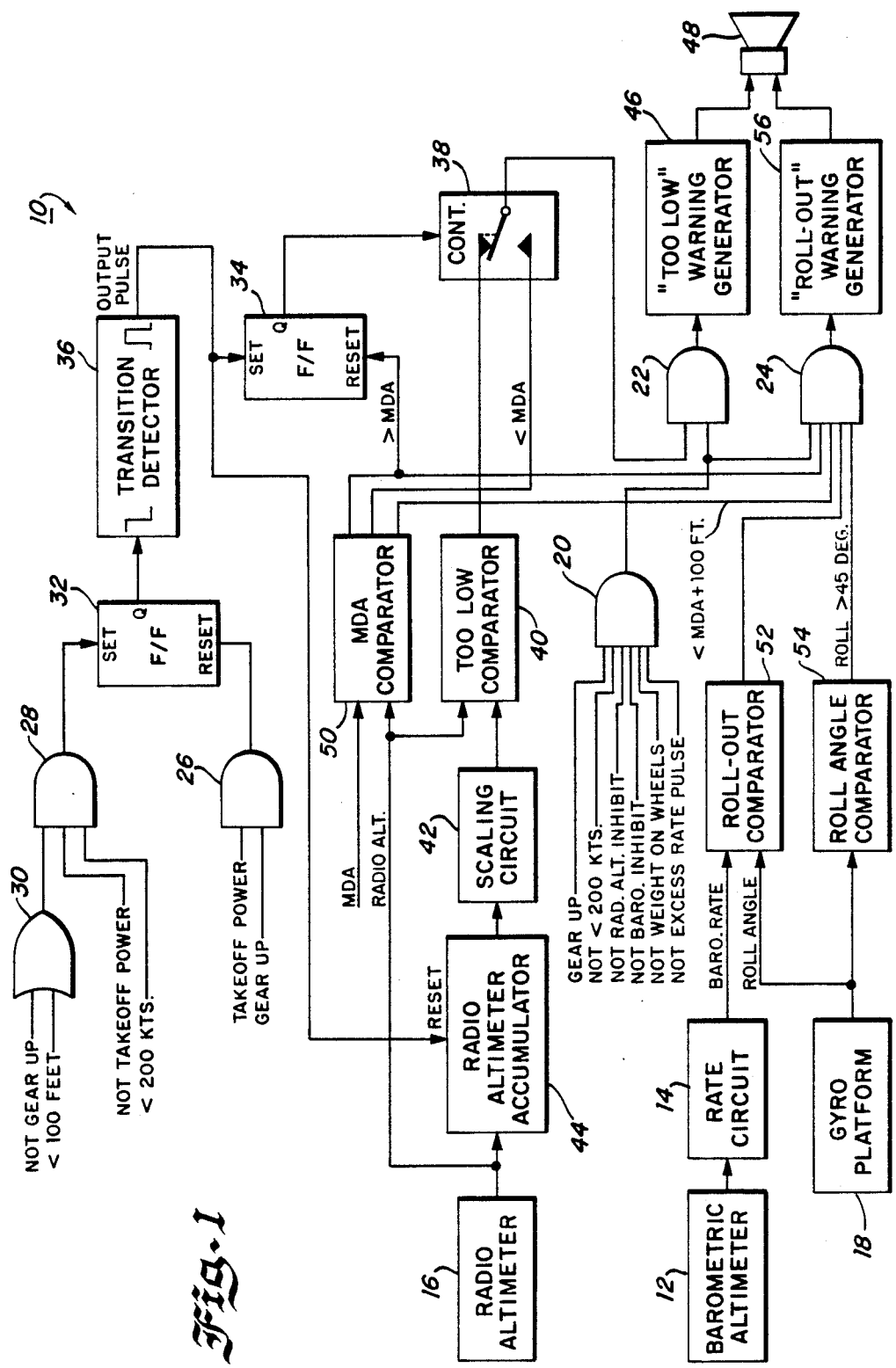
FIG. 1 is a logical block diagram of the warning system according to the invention.

Referring now to the drawing, with particular attention to FIG. 1, there is illustrated an embodiment of a ground proximity warning system according to the invention particularly useful for providing warnings of unsafe flight conditions during low level maneuvering generally designated by the reference numeral 10. The system 10 according to the invention is illustrated in FIG. 1 in functional or logical block diagram form as a series of gates, comparators, flip-flops and the like for purposes of illustration; however, it should be understood that the actual implementation of the logic can be other than as shown in FIG. 1, with various digital and analog implementations being possible. The signals used by the warning system as described include radio altitude, barometric altitude rate, airspeed, engine RPM, roll angle of the aircraft, the minimum decision altitude and signals indicating the position of the aircraft landing gear along with various validity signals. Depending on the type of aircraft in which the warning system is installed, the signals shown in FIG. 1 can be obtained from individual instruments such as a barometric altimeter 12, a barometric altitude rate circuit 14 a radio altimeter 16 and a gyroscopic platform 18, as well as various discrete circuit element such as a discrete element indicating the position of the landing gear. These signals may also be obtained from a digital data bus in certain newer aircraft. In addition, instead of obtaining the altitude rate signal from the barometric altitude rate circuit, the Z velocity signal from the inertial navigation system may be used to provide a representation of the descent rate.

As previously stated, the system according to the invention is designed to provide different warnings during different phases of aircraft operation. For example, the system is designed to provide a first warning, such as, for example, an aural or voice warning "TOO LOW" should the aircraft descend below the minimum decision altitude during low level cruise. This warning will also be generated if the aircraft should lose a predetermined percentage of the altitude attained after take-off, but prior to reaching the minimum decision altitude. In addition, the system is designed to provide a second specific warning, such as, for example, the aural or voice signal "ROLL OUT" should the aircraft descend too rapidly during a roll maneuver. Consequently, logic circuitry is provided to indicate to the system the particular flight phase in which the aircraft is operating, i.e., take-off, low level cruise or low level maneuvering so that the appropriate warning will be generated should certain flight parameters be exceeded. This function is provided by the logic circuitry including AND gates 20, 22, 24, 26, and 28, an OR gate 30, a pair of set/reset flip-flops 32 and 34, a transition detector 36 and a switch 38 controlled by the flip-flop 34.

Because the system is designed to be operational to provide warnings during take-off, low level cruise and low level maneuvering phases of flight, certain determinations must be made to determine whether the aircraft is indeed in one of the aforementioned phases. The initial determinations are made by the AND gate 20 which provides an enabling signal to the AND gates 22 and 24 only if certain conditions are met. These conditions are that there is no weight on the wheels, indicating that the aircraft is actually flying, that the gear is up and the aircraft is not flying slower than 200 knots, thereby indicating that the aircraft is not in a landing configuration. Also, for the system to be operational, the barometric altimeter 12, the barometric rate circuit 14 and the radio altimeter must be operating properly. Consequently, signals indicating that the barometric altimeter and radio altimeter have not been inhibited, as well as a signal indicating that the rate of the radio altitude is not excessive are applied to the gate 20 to cause the gate 20 to enable the gates 22 and 24 only if the signals from the barometric altimeter 12, the barometric rate circuit 14 and the radio altimeter 16 are valid.

In addition to determining whether the aircraft is flying in a configuration other than a landing configuration and that the instruments are operating properly, it is necessary to determine whether the aircraft is in an approach phase, or in a take-off or a go-around after missed approach phase. This determination is made by the AND gates 26 and 28, the OR gate 30 and the set/reset flip-flop 32. In the implementation shown, a take-off or a go-around after a missed approach is indicated only if both the conditions that take-off power is present and that the landing gear is up are met. If both conditions are met, the set/reset flip-flop 32 is reset. Signals indicative of take-off power that are applied to the gate 26 can be obtained from various sources, for example, from a comparator circuit that provides an enabling signal to the gate 26 when the RPM of the engine is sufficiently high to indicate take-off power, or from a discrete element indicating throttle position. An engine tachometer, which indicates for example, the RPM of the primary compressor of a jet engine, can be used to provide the engine RPM signal, and a predetermined RPM, for example, 90% of maximum engine RPM, can be used to indicate take-off power. The gear up signal can readily be obtained from another discrete element, such as, from a switch operated by the landing gear or by the landing gear control handle in the cockpit.

An approach condition is indicated by the gates 30 and 28 when the gear is not up or the aircraft is below 100 feet and the engine is not producing take-off power and the speed of the aircraft is below 200 knots. An approach condition indication from the gate 28 serves to set the flip-flop 32.

In operation, during the take-off phase of flight, the set/reset flip-flop 32 is reset, thereby causing the Q output of the flip-flop 32 to change from a high state to a low state. This transition is detected by the transition detector 36 which generates an output pulse in response to the transition and sets a set/reset flip-flop 34. This causes the Q output of the flip-flop 34 to operate the switch 38 to the position shown in FIG. 1, thereby to connect one input of the gate 22 to circuitry including a too low comparator 40, a scaling circuit 42 and a radio altitude accumulator 44. These devices determine when a "TOO LOW" warning should be generated by a generator 46 during the take-off mode of operation.

After the aircraft has completed its take-off, as evidenced by the radio altitude exceeding the minimum decision altitude (MDA), an MDA comparator 50 provides a signal indicating that the aircraft has exceeded the minimum decision altitude in order to reset the input of the flip-flop 34, thereby resetting the flip-flop 34. When the flip-flop 34 is reset, the switch 38 is operated to disconnect the gate 22 from the too low comparator 40 and connected to a LESS THAN MDA output of the MDA comparator 50, thereby making the system responsive to any descents below the minimum decision altitude. Consequently, if the aircraft drops below the minimum decision altitude when in this mode, the warning generator 46 will generate the "TOO LOW" warning and apply it to the transducer 48.

As long as the altitude of the aircraft is below the minimum decision altitude plus a predetermined increment, such as, for example, between 100 and 200 feet, preferably 100 feet, but not below the minimum decision altitude, the AND gate 24 is enabled by the comparator 50 via the GREATER THAN MDA and LESS THAN MDA+100 FEET (or up to MDA+200 FEET) signals applied to two of its inputs. When so enabled, the AND gate 24 is made responsive to a pair of comparators 52 and 54 to operate a second warning generator 56 which generates a second warning such as, for example, "ROLL OUT" when the descent rate of the aircraft exceeds a predetermined level for a given roll angle.

Discussing the operation in greater detail, as the aircraft takes off, the flip-flop 32 is reset, thereby causing the transition detector 36 to provide an output pulse to set the flip-flop 34 to thereby connect the gate 22 to the comparator 40. The output pulse from the transition detector 36 also resets the radio altitude accumulator to zero, or to a predetermined low value setting, such as, for example, 50 feet. The radio altitude accumulator receives the altitude signals from the radio altimeter 16, and retains the highest altitude reached since take-off. This maximum value of radio altitude reached since take-off is applied to a scaling circuit which multiplies by a scaling factor, for example, 75% and applies to the too low comparator 40 which controls the operation of the too low warning generator 46 during the take-off phase of operation.

The radio altimeter signal is also applied to the too low comparator 40, and as long as the radio altitude remains above the maximum radio altitude multiplied by the scaling factor, no warning is generated. However, if the radio altitude drops below the scaled maximum altitude, for example, below 75% of the maximum altitude reached during the flight, the comparator 40 will provide a signal to the gate 22. This signal will cause the gate 22 to provide a signal to the "TOO LOW" warning generator 46 and cause the generator 46 to generate the "TOO LOW" warning and apply it, either directly or indirectly, to the transducer 48, provided that the other input of the gate 22 is enabled by the gate 20.

The radio altitude signal from the altimeter 16 is also applied to the MDA comparator 50 which monitors the radio altitude signal from the radio altimeter 16 and provides a GREATER THAN MDA signal to the flip-flop 34 when the radio altitude exceeds the minimum decision altitude. This signal resets the flip-flop 34 and causes the switch 38 to connect the gate 22 to the MDA comparator 50 so that any warning generated will be controlled by MDA comparator 50. The MDA comparator 50 continues to monitor the radio altitude, and no warning is initiated as long as the radio altitude remains above the minimum decision altitude. However, if the altitude drops below the minimum decision altitude and the gate 22 is enabled by the gate 20, the MDA comparator will provide a LESS THAN MDA signal to the gate 22 to cause the gate 22 to initiate the "TOO LOW" warning by the warning generator 46.

As the aircraft climbs above the minimum decision altitude, but remains below the minimum decision altitude plus a predetermined increment, such as, 100 feet and as long as the gate 20 provides an enabling signal, the gate 24 will be under the control of a roll-out comparator 52 and a roll angle comparator 54. The function of the comparators 52 and 54 is to monitor the roll angle and barometric descent rate of the aircraft, and to cause the gate 24 to initiate a warning by the warning generator 56 if an unsafe combination of descent rate and roll angle exists.

As previously discussed, aircraft tend to descend as the roll angle is increased. However, this tendency is not significant until the roll angle exceeds a predetermined level, such as, for example, 45° for modern fighter/attack aircraft such as the Fairchild A10. Consequently, the roll angle comparator 54 monitors the roll angle signal generated by the gyro platform 18, or similar device indicating the roll angle of the aircraft, and provides an enabling signal to the gate 24 when the roll angle reaches the roll angle at which the aircraft tends to sink. This permits the "ROLL OUT" warning to be generated by the generator 56 if the barometric descent rate exceeds the maximum rate permitted for a given roll angle, as determined by the roll-out comparator 52. The conditions necessary for the "ROLL OUT" warning to be generated are further discussed in connection with the discussion of FIG. 3.

Figure 2:
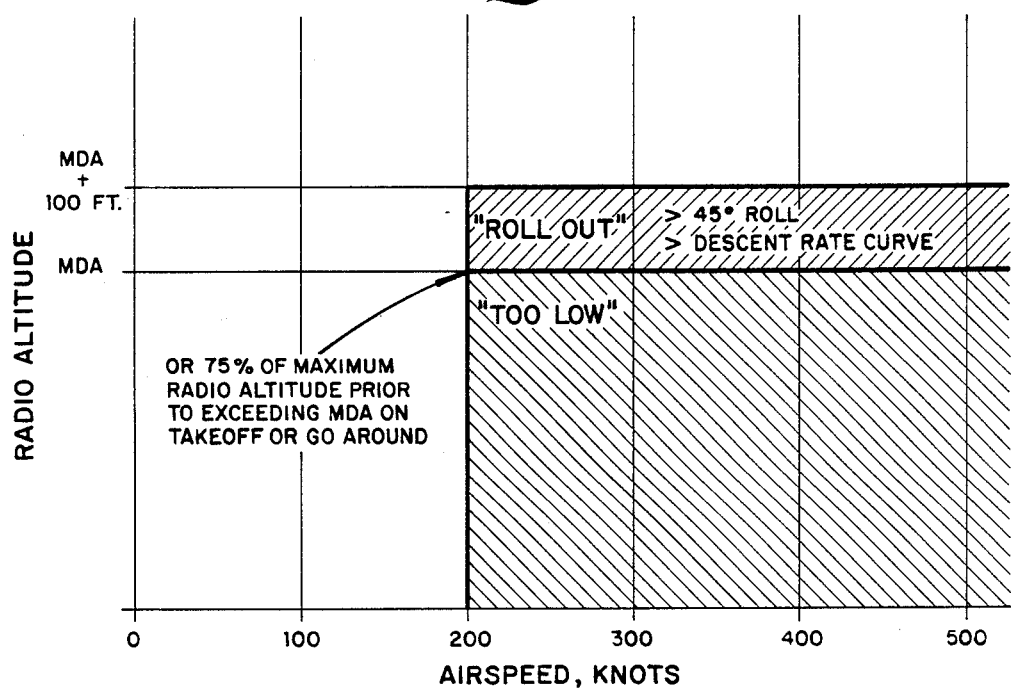
FIG. 2 is a graph illustrating the relationship between airspeed and radio altitude where warnings may be generated.

Referring to FIG. 2, there is shown a graph illustrating the conditions necessary to generate the "TOO LOW" warning and to enable the "ROLL OUT" warning as a function of airspeed and altitude. These conditions are illustrated by the two shaded areas on the graph. As is apparent from FIG. 2, neither warning can be generated as long as the airspeed of the aircraft is below a predetermined value, in this embodiment 200 knots. As long as the airspeed of the aircraft exceeds 200 knots, and the other previously discussed conditions are met, the "TOO LOW" warning will be given whenever the aircraft drops below the minimum decision altitude, or below a predetermined percentage, for example 75%, of the maximum altitude reached on take-off or go-around prior to exceeding the minimum decision altitude.

When the altitude of the aircraft exceeds the minimum decision altitude, but is below the minimum decision altitude plus a predetermined increment, such as, for example, 100 feet, the "ROLL OUT" warning is enabled. However, the "ROLL OUT" warning is not automatically generated when the "ROLL OUT" warning boundary illustrated in FIG. 2 is penetrated, as is the case when the "TOO LOW" warning boundary is penetrated. Rather, the "ROLL OUT" warning mode is only enabled, but the actual warning is produced only if the roll angle exceeds a predetermined angle, for example, 45°, and if the descent rate penetrates the boundary of the descent rate curve (FIG. 3) which defines the maximum permissible descent rate as a function of roll angle.

Figure 3:
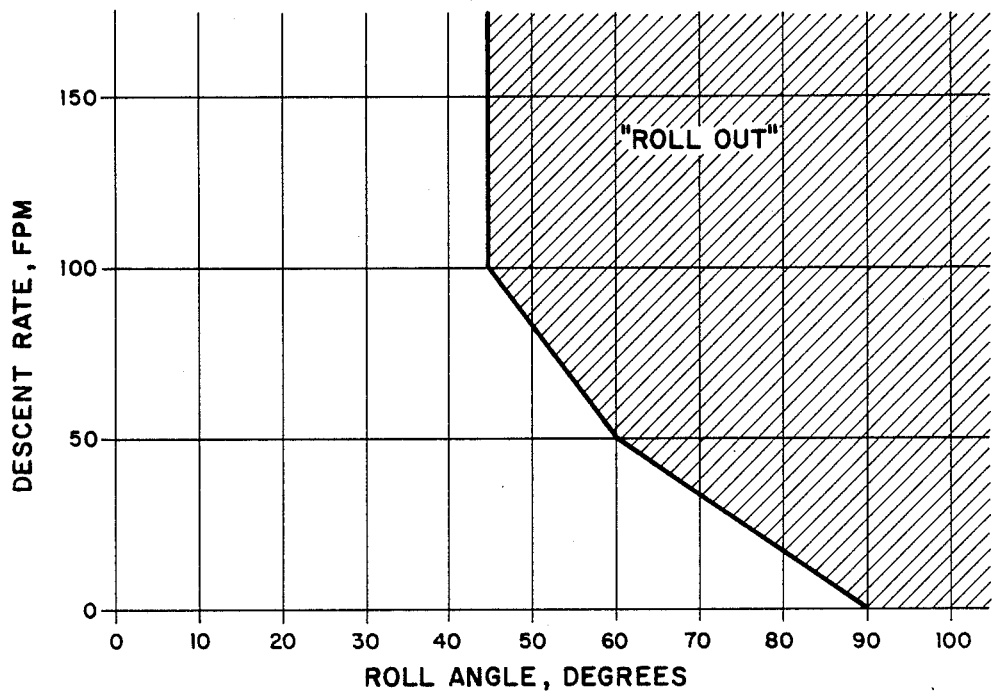
FIGS. 3 and 4 are graphs showing the relationship between barometric altitude rate and roll angle required to generate a warning that the aircraft is descending at an excessive rate during a roll maneuver.

A descent rate curve which has been found to be particularly suitable for use in aircraft such as the Lockheed T-33 is illustrated in FIG. 3. The shaded area shows the relationship between roll angle and barometric descent rate necessary to generate the "ROLL OUT" warning. The descent rate signal used to generate the warning may be a barometric rate signal or a Z velocity signal from the inertial navigation system. As can be seen from FIG. 3, the "ROLL OUT" warning is not generated until the roll angle reaches 45°, at which point the "ROLL OUT" warning is generated if the barometric altitude descent rate exceeds 100 feet per minute. As the roll angle is increased to 60°, only 50 feet per minute of descent rate is required to initiate a warning, and when the roll angle reaches 90°, no descent at all can be tolerated because the lift provided by the wings under this condition is virtually zero.

Figure 4:
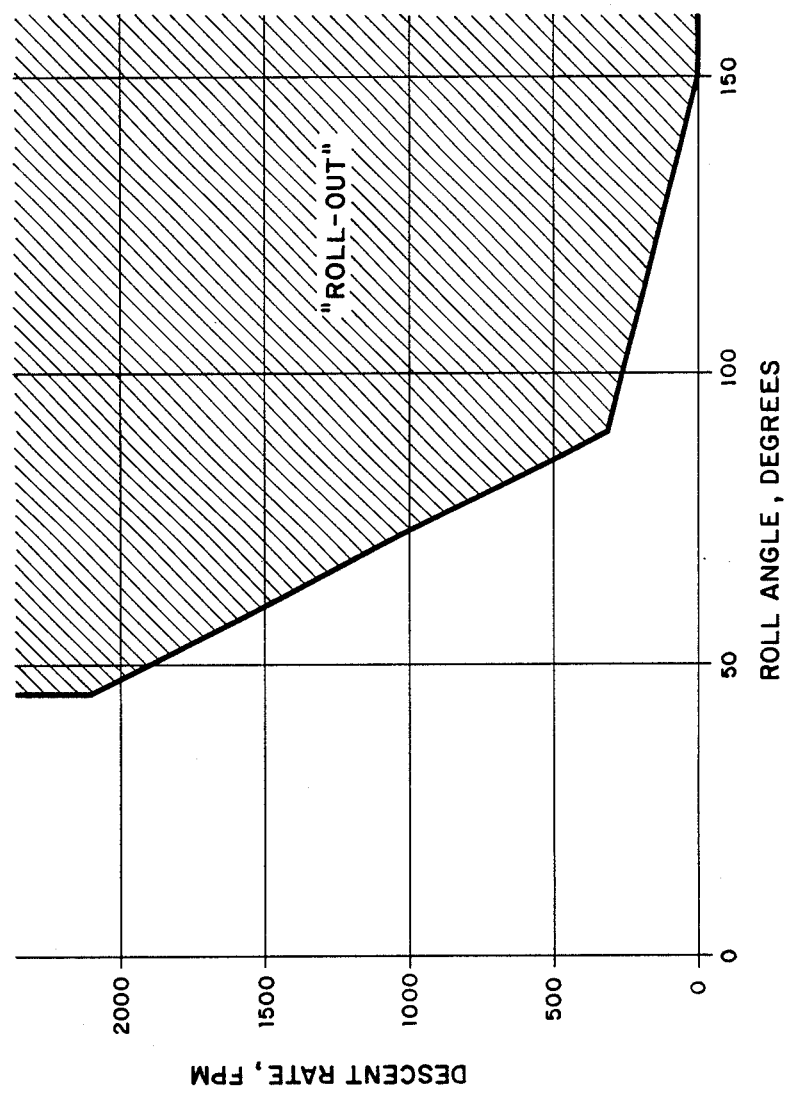

The shape of a descent rate curve is aircraft dependent, i.e., its shape is a function of the performance of the aircraft and the way the aircraft is used. The shape of the descent rate curve illustrated in FIG. 3 has been optimized for aircraft such as the Lockheed T-33 and similar aircraft, and for the conditions under which such aircraft are flown. However, for higher performance aircraft it is necessary to permit higher descent rates before generating a warning in order to avoid nuisance warnings during violent maneuvers. A descent rate curve for such a high performance aircraft is illustrated in FIG. 4. The shape of the descent rate curve illustrated in FIG. 4 has been optimized for the Fairchild A-10 and similar aircraft, and permits higher descent rates, as well as higher roll angles to occur before a warning is generated. As is apparent from FIG. 4, a descent rate of 2100 feet per minute is permitted at a roll angle of 45° before a warning is given. At a roll angle of 90°, a descent rate of 300 feet per minute is permitted. In addition, some degree of descent rate is permitted at roll angles in excess of 90°. It is not until the roll angle reaches 150° before no descent rate at all is permitted. Also, some degree of tolerance is permitted in the system. For example, at 2100 feet per minute, the roll angle may be between 40° and 50° before a warning is generated. At a 90° roll angle, the descent rate may range between 100 feet per minute and 500 feet per minute before a warning is generated.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A warning system for alerting the pilot of an aircraft of a dangerous flight condition after take-off and during low altitude maneuvering, comprising:
   means for monitoring the radio altitude of the aircraft after take-off and storing an indication of the highest radio altitude reached during the flight;
   means for selecting a minimum desired radio altitude; and
   means responsive to a signal representation of the radio altitude of the aircraft, to said altitude indication storing means and to said minimum altitude selecting means for providing a first specific warning if the altitude of the aircraft drops below the minimum desired altitude or below a predetermined percentage of the highest radio altitude reached during the flight if the aircraft has not yet reached the predetermined minimum desired altitude.

2. A warning system for alerting the pilot of an aircraft of a dangerous flight condition after take-off and during low altitude maneuvering, comprising:
   means for monitoring the altitude above ground of the aircraft after take-off and storing an indication of the highest altitude above ground reached during the flight;
   means for selecting a minimum desired altitude above ground;
   means responsive to a signal representative of the altitude above ground of the aircraft, to said altitude indication storing means and to said minimum altitude selecting means for providing a first specific warning if the altitude of the aircraft drops below the minimum desired altitude or below a predetermined percentage of the highest altitude above ground reached during the flight if the aircraft has not yet reached a predetermined minimum desired altitude; and
   means responsive to a signal representative of the power output of the engine and to the position of the landing gear for rendering said system operative to provide said warning indication if the altitude drops below said predetermined percentage of the highest altitude reached if the landing gear is up and the engine is at take-off power.

3. A warning system as recited in claim 1 further including means responsive to a signal representative of the airspeed of the aircraft for rendering said system operative to provide said warning indication only when the airspeed of the aircraft exceeds a predetermined speed.

4. A warning system as recited in claim 3 wherein said predetermined airspeed is approximately 200 knots.

5. A warning system as recited in claim 1 further including means responsive to a signal representative of the roll angle of the aircraft for rendering said system operative to generate a second specific warning when the roll angle of the aircraft exceeds a predetermined amount.

6. A warning system as recited in claim 5 further including means responsive to a signal representative of the descent rate of the aircraft for causing said second specific warning to be given only when the roll angle and descent rate of the aircraft each exceed a predetermined amount.

7. A warning system as recited in claim 6 wherein said second specific warning is given at an altitude range that is higher than the altitude range at which said first specific warning is given.

8. A warning system as recited in claim 7 wherein the range of altitudes at which said second specific warning is given is approximately 100 to 200 feet higher than the range of altitudes at which said first specific warning is given.

9. A warning system as recited in claim 8 wherein the range of altitudes at which said second specific warning is given is approximately 100 feet higher than the range of altitudes at which said first specific warning is given.

10. A warning system as recited in claim 5 wherein said system is rendered operative to generate said second specific warning when the roll angle of the aircraft exceeds approximately 45°.

11. A warning system as recited in claim 1 wherein said predetermined percentage of the highest altitude reached is approximately 75% of the altitude above ground reached during the flight.

12. A system for alerting the pilot of an aircraft of a dangerous flight condition during low altitude maneuvering comprising:
   means for generating a first specific warning if the aircraft descends below a minimum altitude; and
   means for generating a second specific warning above the minimum altitude as a function of the roll angle and descent rate of the aircraft.

13. A system as recited in claim 12 further including means for enabling said second specific warning generating means only after the roll angle exceeds a predetermined value.

14. A system as recited in claim 13 wherein said predetermined value of roll angle is approximately 55°.

15. A system as recited in claim 12 further including means for enabling said second specific warning generating means only below a second altitude and above the minimum altitude.

16. A system as recited in claim 15 wherein said second altitude is approximately 100 to 200 feet above said minimum altitude.

17. A system as recited in claim 16 wherein said second altitude is approximately 100 feet above said minimum altitude.

18. A system as recited in claim 12 wherein said descent rate is a barometric descent rate.

19. A system as recited in claim 12 wherein said warning is generated when said roll angle exceeds approximately 45° and the descent rate exceeds approximately 100 feet per minute.

20. A system as recited in claim 12 wherein said warning is generated when said roll angle exceeds approximately 60° and the descent rate exceeds approximately 50 feet per minute.

21. A system as recited in claim 12 wherein said warning is generated when said roll angle exceeds approximately 90° and the descent rate exceeds approximately 0 feet per minute.

22. A system as recited in claim 12 wherein said warning is generated when said roll angle exceeds approximately 45° and the descent rate exceeds approximately 2100 feet per minute.

23. A system as recited in claim 12 wherein said warning is generated when said roll angle exceeds approximately 90° and the descent rate exceeds approximately 300 feet per minute.

24. A system as recited in claim 12 wherein said warning is generated when said roll angle exceeds approximately 150° and the descent rate exceeds approximately 0 feet per minute.

25. A system as recited in claim 12 wherein said predetermined value of descent rate varies inversely with respect to the roll angle.

26. A system as recited in claim 25 further including means for enabling said first and second specific warning means only when the airspeed exceeds a predetermined value.

27. A system as recited in claim 26 wherein said predetermined value of airspeed is approximately 200 knots.

28. A system for providing a warning to the pilot of an aircraft maneuvering near the ground comprising:
   means for generating a signal representative of the roll angle of the aircraft;
   means for generating a signal representative of the descent rate of the aircraft; and
   means responsive to a signal representative of the roll angle of the aircraft and to a signal representative of the descent rate of the aircraft for generating a warning to the pilot when the combination of roll angle and descent rate exceeds a predetermined level.

29. A system as recited in claim 28 further including means for preventing the generation of a warning if the altitude of the aircraft exceeds a predetermined level.

30. A system as recited in claim 29 further including means for preventing the generation of said warning if the altitude of the aircraft drops below a predetermined minimum altitude.

31. A system as recited in claim 30 further including means for generating a different warning if the aircraft drops below said predetermined minimum altitude.

32. A system as recited in claim 31 wherein said system includes means for manually setting said predetermined minimum altitude.

33. A system as recited in claim 32 further including means for automatically setting said predetermined minimum altitude to a predetermined percentage of the maximum altitude reached after take-off if the aircraft has not yet reached the manually set minimum altitude.

34. A system as recited in claim 33 wherein said predetermined percentage is approximately 75%.

35. A warning system for alerting the pilot of an aircraft of a dangerous flight condition after take-off and during low altitude maneuvering, comprising:
   means for providing a signal representative of the radio altitude of the aircraft;
   means responsive to said radio altitude signal providing means for storing an indication of the highest radio altitude reached after take-off; and
   means responsive to said radio altitude signal providing means and to said altitude signal provided by the altitude signal providing means drops to a predetermined percentage of the highest altitude reached after predetermined percentage of the highest altitude reached after take-off;
   wherein said altitude signal providing means includes a radio altimeter;
   wherein said radio altimeter includes minimum altitude selecting means for manually selecting a predetermined altitude, wherein said system is responsive to said minimum altitude selecting means for providing a warning if the altitude of the aircraft drops below the minimum altitude after having exceeded the minimum altitude.

36. A warning system for alerting the pilot of an aircraft of a dangerous flight condition after take-off and during low altitude maneuvering, comprising:
   means for providing a signal representative of the radio altitude of the aircraft;
   means responsive to said radio altitude signal providing means for storing an indication of the highest altitude reached by the aircraft after take-off;
   means for manually setting a minimum altitude;
   means for providing a signal representative of the descent rate of the aircraft;
   means for providing a signal representative of the roll angle of the aircraft;
   means responsive to said altitude signal providing means, to said manually settable minimum altitude setting means and to said highest altitude storing means for providing a first specific warning if the aircraft descends below a predetermined percentage of the maximum altitude reached prior to reaching the manually set minimum altitude, and for generating said first specific warning if the aircraft drops below the manually set minimum altitude after having exceeded it; and means responsive to said roll angle signal providing means and said descent rate signal providing means for providing a second specific warning when the aircraft is above said minimum altitude and the descent rate exceeds a predetermined rate that is a function of roll angle.

37. A warning system as recited in claim 36 wherein said second specific warning is generated only if the roll angle exceeds a predetermined value.

38. A warning system as recited in claim 37 wherein the predetermined value of roll angle required to generate said second specific warning is approximately 45°.

39. A warning system as recited in claim 36 wherein the descent rate required to generate said second specific warning varies inversely with respect to the roll angle.

40. A warning system as recited in claim 36 further including means responsive to the altitude above ground signal providing means for inhibiting the generation of said second specific warning when the altitude exceeds a predetermined altitude.

41. A warning system as recited in claim 36 wherein said second specific warning is enabled when the aircraft altitude is within a predetermined increment above the manually set minimum altitude.

42. A warning system as recited in claim 41 wherein said predetermined increment is approximately 100 to 200 feet.

43. A warning system as recited in claim 42 wherein said predetermined increment is approximately 100 feet.

44. A warning system for alerting the pilot of an aircraft of a dangerous flight condition after take-off and during low altitude maneuvering, comprising:
    means for providing a signal representative of the altitude above ground of the aircraft;
    means responsive to said altitude above ground signal providing means for storing an indication of the highest altitude reached by the aircraft after take-off;
    means for manually setting a minimum altitude;
    means for providing a signal representative of the descent rate of the aircraft;
    means for providing a signal representative of the roll angle of the aircraft;
    means responsive to said altitude signal providing means, to said manually settable minimum altitude setting means and to said highest altitude storing means for providing a first specific warning if the aircraft descends below a predetermined percentage of the maximum altitude reached prior to reaching the manually set minimum altitude, and for generating said first specific warning if the aircraft drops below the manually set minimum altitude after having exceeded it;
    means responsive to said roll angle signal providing means and said descent rate signal providing means for providing a second specific warning when the aircraft is above said minimum altitude and the descent rate exceeds a predetermined rate that is a function of the roll angle; and
    means for providing a signal indicative of the position of the aircraft landing gear, means for providing an indication of the power output of the engine, and means responsive to said landing gear position signal providing means and said engine power indication providing means for rendering the system operative to generate warnings when the landing gear is up and the engine is developing take-off power.

45. A warning system as recited in claim 44 wherein said engine power indication providing means includes a tachometer.

46. A warning system as recited in claim 36 wherein said second specific warning is generated when said roll angle exceeds approximately 45° and the descent rate exceeds approximately 100 feet per minute.

47. A warning system as recited in claim 46 wherein said second specific warning is also generated when said roll angle exceeds approximately 60° and the descent rate exceeds approximately 50 feet per minute.

48. A warning system as recited in claim 47 wherein said second specific warning is also generated when said roll angle exceeds approximately 90° and the descent rate exceeds approximately 0 feet per minute.

49. A warning system as recited in claim 48 wherein the descent rate required to generate said second specific warning varies linearly between 45° and 60° and between 60° and 90°.

50. A system as recited in claim 36 wherein said second specific warning is generated when said roll angle exceeds approximately 45° and the descent rate exceeds approximately 2100 feet per minute.

51. A warning system as recited in claim 50 wherein said second specific warning is also generated when said roll angle exceeds approximately 90° and the descent rate exceeds approximately 300 feet per minute.

52. A system as recited in claim 51 wherein said second specific warning is also generated when said roll angle exceeds approximately 150° and the descent rate exceeds approximately 0 feet per minute.

53. A warning system as recited in claim 52 wherein the descent rate required to generate said second specific warning varies linearly between 45° and 90° and between 90° and 150°.

54. A warning system for alerting the pilot of an aircraft of a dangerous flight condition after take-off and during low altitude maneuvering, comprising:
    means for providing a signal representative of the radio altitude of the aircraft;
    means responsive to said radio altitude signal providing means for storing an indication of the highest radio altitude reached after take-off;
    means responsive to said radio altitude signal providing means and to said altitude indication storing means for providing a warning if the altitude signal providing means drops to a predetermined percentage of the highest altitude reached after take-off;
    means for providing a signal representative of the airspeed of the aircraft;
    means responsive to said airspeed representative signal for rendering said system operative to generate a warning only if the airspeed exceeds a predetermined value; and
    means for providing a signal representative of the roll angle of the aircraft, means for providing a signal representative of the descent rate of the aircraft, and means responsive to said roll angle signal providing means and said descent rate signal providing means for generating a second warning if both the airspeed and descent rate exceed predetermined values.

55. A warning system as recited in claim 54 wherein the predetermined value of descent rate required to generate said second warning is an inverse function of roll angle.

* * * * *